United States Patent [19]

Chisholm

[11] Patent Number: 4,866,450
[45] Date of Patent: Sep. 12, 1989

[54] ADVANCED INSTRUMENT LANDING SYSTEM

[75] Inventor: John P. Chisholm, Olympic Valley, Calif.

[73] Assignee: Sundstrand Data Control, Inc., Redmond, Wash.

[21] Appl. No.: 258,060

[22] Filed: Oct. 14, 1988

Related U.S. Application Data

[63] Continuation of Ser. No. 863,662, May 15, 1986, abandoned.

[51] Int. Cl.$^4$ .......................... G01S 1/16; G01S 13/00
[52] U.S. Cl. .................................. 342/410; 342/413; 342/33
[58] Field of Search ............... 342/352, 356, 357, 393, 342/410–412, 414, 30, 31, 33, 34, 35; 364/428, 429

[56] References Cited

U.S. PATENT DOCUMENTS 3,566,404  2/1971  Sorkin .................................... 342/31
3,634,862  1/1972  Hiscox et al. ....................... 342/413

OTHER PUBLICATIONS

Perreault Civilian Receivers Navigate by Satellite, MSN, vol. 11, No. 1, Jan. 1981.

Primary Examiner—Thomas H. Tarcza
Assistant Examiner—Gregory C. Issing
Attorney, Agent, or Firm—Michael S. Yatsko; Trevor B. Joike

[57] ABSTRACT

A system for landing an aircraft is described, using a ground installation and an airborne installation which are synchronized together using GPS system time. Specifically, the ground installation includes a ground transmitter which radiates the sequence of signals which provide precision guidance information to the aircraft, an aircraft installation which includes a radio receiver and a processor to receive and process the transmitted guidance signals and to provide indications to aid the pilot in landing the aircraft, a GPS receiver in the air and on the ground for producing signals representative of GPS system time, and a channel selector in the aircraft for actuating the processor to synchronize its operation with the ground installation transmitter. Range information is provided by measuring the time interval between the transmission of a reference at the ground and its receipt in the air.

25 Claims, 1 Drawing Sheet

ADVANCED INSTRUMENT LANDING SYSTEM

This application is a continuation of application Ser. No. 863,662, filed on May 15, 1986, now abandoned.

TECHNICAL FIELD

This invention relates to an advanced instrument landing system, and more particularly relates to improvements in a type of landing system in which all ground installations sequentially radiate guidance pulses on the same frequency, the improvement permitted the ground installation of such a same-frequency landing system to radiate at uniquely assigned times in an established clock system and to be uniquely identified by an aproaching aircraft that has both knowledge of such uniquely assigned times and access to the established clock system time. The improvement also provides, to the aircraft, a precision range to the ground station.

BACKGROUND OF THE INVENTION

In cases where a ground installation of a single frequency landing system is remotely located from other similar installations, there is no need for the ground station to radiate at an assigned time, and the approaching aircraft has no difficulty in identifying the ground installation. However, in impacted geographic locations, where there are multiple similar landing installations located relatively closely together, it is necessary to provide means for uniquely identifying at least one such same-frequency installation to the exclusion of others in the vicinity.

In conventional landing systems, such as the conventional Instrument Landing System (ILS) and the FAA Microwave Landing System (MLS), unique identification and signal exchanges between approaching aircraft and a particular ground installation are established by uniquely assigning different frequencies out of a band of frequencies to each of the various installations, and tuning the airborne units to the frequency of the selected installation. The FAA MLS system has 200 separate frequency channels assigned for its use in the band of 5000 to 5250 MHz. The ILS system has some 40 channels in paired bands allocated to its use in the vicinity of 100 and 300 MHz. Therefore, an adequate number of separately indentifiable channels for a single frequency landing system can be inferred as being between 40 and 200 channels. In my patent 4,429,312 entitled "Independent Landing Motoring System", a different type of identification of a same-frequency landing installation is discussed in which some of the signals transmitted to the aircraft are pulse encoded to identify that installation. That system is generally satisfactory when the aircraft is in a remote area isolated from other ground stations and when the aircraft has a weather radar to interrogate the ground installation, a decoding circuit added to the radar together, and an appropriate code selector switch for station selection in the cockpit.

However, not all aircraft have weather radars to interroate the ground installation. In addition, where there are several airfields in close geographic proximity, or where there are several landing installations of this type at the same airport, the same-frequency signals from all such landing systems can arrive at the aircraft simultaneously and hence they cannot be adequately separated for unique range tracking identification and guidance generation purposes. This is basically the same problem that plagues the conventional Air Traffic Control Radar Beacon System (ATCRBS) used by the FAA for air traffic control measures; it is called "garbling". The weather radar technique of my U.S. Pat. No. 4,429,312, with associated identifying codes, is thus very suitable for use at isolated remote sites, such as offshore oil rigs, but not suitable for areas with many same-frequency landing systems in close proximity. The problem comes basically from the fact that these systems, and the airborne radars all use a common frequency. Thus, there is no way to trigger one particular installation uniquely for positive identification purposes. There is, therefore, always the risk of undesirably triggering a nearby installation, with the result that confusing responses to the aircraft from both locations will be synchronously received in that aircraft.

In addition to a method of uniquely identifying a particular same frequency ground station, a very desirable characteristic for a landing system is the capability of providing range information. Range data has at least three major uses:

1. a means for alerting the pilot of his proximity to touchdown;

2. a means for automatically reducing the gain of the landing installation as the aircraft range to touchdown diminishes in order to maintain loop stability (often referred to as "course softening"); and 3. a means for using the elevational angular data provided by the landing system to determine altitude above the runway during the approach.

In the conventional ILS system, range to touchdown is generally provided by marker beacons on the ground at established distances from touchdown. These beacons radiate vertical fan shapped-beams through which the approaching aircraft passes. The range information thus acquired in the aircraft is used for pilot alerting and for "course softening" purposes.

In FAA MLS and conventional ILS practice, an alternative and more accurate measurement of range is provided by conventional TACAN/DME interrogators which are carried by almost all aircraft. The airborne TACAN/DME equipment interrogates a DME beacon that is co-located with the MLS or ILS ground installation and receives therefrom a direct measurement of range using usual DME techniques.

For some landing applications, a very precise measurement of range is required, and for this purpose, a Precision DME (usually referred to as PDME) is employed. The PDME is similar to the conventional DME, but uses faster rise time pulses to obtain higher precision. This PDME system imposes on aircraft, which have to use it in order to obtain a required very precise measurement of range, the additional burden of having installeld on board appropriate PDME airborne equipment. Another technique for obtaining precision range in a landing system is provided by the teaching of my U.S. Pat. No. 4,429,312. Range is measured in this disclosure by having the weather radar interrogate the landing system ground installation and trigger the transmission of pulsed angular guidance signals. These pulsed replies are synchronous with the weather radar interrogations and are range tracked in a conventional manner to provide precision range in the aircraft. Range measurements of higher precision can be obtained by the use of fast rise time pulses.

Both of the above described methods for identifying ground station installations (i.e., frequency selection or pulse group encoding) require additional equipment and adjustable cockpit controls for either tuning to the frequency of the ground installation, or for selecting the decodement of the signals radiated from that ground station. In addition, measurement of range, by means of marker beacons or DME equipment, requires the installation of appropriate marker beacons or DME beacons at the landing system ground installation. The measurement of very precise range requires the addition of specialized PDME equipment, both air and ground. While the use of the weather radar to provide precision range (as taught in my U.S. Pat. No. 4,429,312) eliminates the need for added PDME equipment, not all aircraft carry a weather radar. Thus, all conventional landing systems have tended to require added airborne equipment, or cockpit controls, or both, in order to achieve unique communication with and range to a selected ground installation.

In addition to the two techniques discussed above for obtaining range (i.e., the aircraft passing over marker beacons and the measurement of the time elapsed between an aircraft's transmission of an interrogation and the aircraft's reception of a reply from a transponder located at the landing system), there is the clocked station technique. That technique may be practiced using high precision clocks and low precision clocks. For example, equipment in one participating unit, such as a ground or airborne station, transmits a signal at a known time in an established very precise clock system. Equipment in a second unit, such as an aircraft, measures the time of reception of that transmitted signal in the same established clock system; by knowing the time at which the signal was transmitted, the propagation time between the two stations and thus the distance can be computed. One known use of this clocked ranging method is the United States Air Force AN/APN-169, Station Keeping Equipment (SKE).

Another means for establishing a common clock time, is for each participant to carry low-cost clocks of nominal stability and to periodically synchronize those clocks to a common time reference. Such synchronization of low-cost clocks may be established by an initial conventional two-way ranging process that determines the ranges between participants and thereafter uses measured range data, by an exchange between participants of relative clock times. Thus, the low-cost clocks of each participant are synchronized to a clock in one selected aircraft out of all participating aircraft. This synchronization process is then repeated at periodic intervals, which intervals occur frequently enough to maintain the common time base to adequate accuracy. A variation of this method of synchronizing all clocks to a clock in a selected unit, is to synchronize all clocks to an "average value" of all the clock times that exist when the clock synchronization process is initiated. See U.S. Pat. Nos. 3,412,399 and 3,434,140 to John Chisholm Therefore, this "local" synchronization process requires a precision ranging and a data exchange or communications system, including transmitters and receivers in each participating unit. A requirement for clock synchronization equipment, in all aircraft, is undesirable in many applications, (i.e., cost, weight and complexity).

One advantage of using a common clock system is that identity may be established by use of "time slotting". In this time slotting concept, each of the participants is assigned a specific clock time at which to radiate, which time repeats at specified intervals. For example, a specific participant, such as No. 3, might radiate on the third second of every minute. Associated with this radiation at a specific time is a subsequent time interval or time slot, during which no other participant can radiate. This use of an established clock time and an associated time slot, by the participant to which it is assigned, permits reception of that transmission by other participants to be used to establish the identity of the sender of that transmission (i.e., any transmission received during that time interval must be from the participant assigned to transmit in that time slot). This use of an assigned time slot or time period to provide a protected identity system can be viewed as being similar to the use of a distinctive frequency for identity, which frequency cannot be used by another station in a specific geographic area.

While the use of established and precise clock time, with precision of the order of a fraction of a microsecond, can provide both precision ranging and unique identity, current use of such a common and precise clock time is limited by the attendant cost and complexity of very stable clocks, such as atomic clocks, or by the cost and complexity of the synchronizing equipment (i.e., communications system, etc.) required for lower cost clocks.

Considered broadly, a landing system does not inherently require the uses of multiple different frequencies since operation at all installation sites is usually performed on a single frequency. Single-frequency operation is an advantage because, if the actual landing guidance system can always operate on the same frequency for different sites, great simplification in terms of airborne equipment complexity and cost is possible. For example, the airborne receiver can be a fixed-frequency device.

Therefore, it should be appreciated that a landing system is needed which would provide both station selection and ranging data in a fixed frequency landing system, while using only airborne equipment which is installed in an IFR (Instrument Flight Rules) aircraft. Moreover, such a system should be simple and low in cost. With the eventual addition of NAVSTAR or Global Positioning System (GPS) Navigation Sets on all but the smallest aircraft, it also would be very desirable to find a means to use GPS to provide channelization (i.e., identity) and range data for single frequency landing systems. This is especially true since such fixed frequency landing systems are, inherently, lower cost and are found in more locations throughout the world. Thus, there is a need for an advanced instrument landing system.

SUMMARY OF THE INVENTION

In accordance with one embodiment of the present invention, a landing system is provided comprising a ground installation and an airborne installation wherein each installation is provided with a GPS receiver that produces a trigger signal representative of GPS system time, a ground installation which radiates a sequence of transmissions which include precision guidance information to assist the aircraft in landing, and an aircraft installation having a receiver and a processor for transforming the precision guidance signals to provide the pilot of the aircraft with indications for guiding the landing of the aircraft. More specificially, the trigger signal from the GPS receiver at the ground installation is further processed to provide, at a specific time assigned to a specific ground installation, a second trigger or actuation signal. The ground installation, in response to the actuation signal, radiates the aircraft guidance signals. In the aircraft installation, the trigger signal from the airborne GPS receiver is further processed to provide, at a specific time (i.e., corresponding to the selection of a specific ground station from which it is desired to receive landing guidance, and a time interval or slot during which signals can be usefully received from such selected ground stations), a signal for actuating the processor to permit such processor to generate landing guidance information. This technique of using GPS clock time, which clock time is available at no incremental cost to a GPS receiver, thus provides positive identity of a selected low-cost single frequency landing system ground station.

In one specific embodiment of the invention, the sequence of signals radiated from the ground installation includes a ranging reference signal. These ranging reference signals, and associated guidance pulses, will be synchronously repetitive as received in the aircraft, with respect to the GPS clock time trigger signals generated in the aircraft. The time at which the ranging reference signal is received in the aircraft can thus be measured by conventional synchronous range tracking circuits, and the distance between the aircraft and the ground installation can thus be precisely calculated. Thus, GPS clock time provides precision range data to a selected low-cost single frequency ground station.

With the advent of GPS, precisely synchronized airborne clocks will become commonplace in airborne vehicles. Thus, availability of such universal time makes the consideration of applying such clock techniques on a wider scale very appropriate. Other advantages and features of the present invention will be come readily apparent from the detailed description of the invention, the embodiments presented, the accompanying drawings, and the claims.

DETAILED DESCRIPTION

Figure 1:
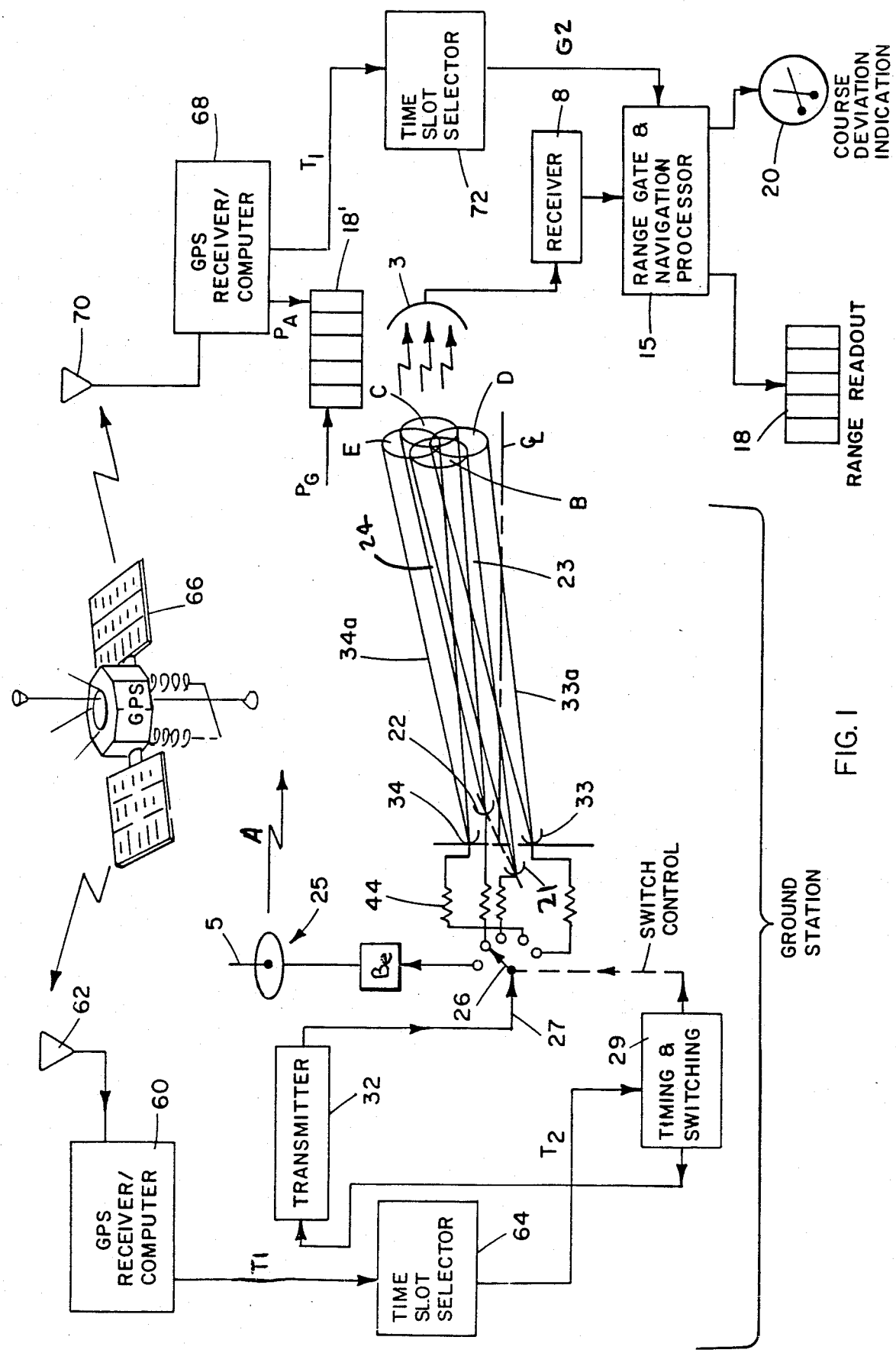
FIG. 1 is a block diagram of the advanced landing system that is the subject of the present invention.

While this invention is susceptible of embodiment in many different forms, there is shown in the drawing and will herein be described in detail, one specific embodiment, with the understanding that the present disclosure is to be considered as an exemplification of the principles of the invention and is not intended to limit the invention to the specific embodiment illustrated.

A preferred embodiment of the present advanced landing system will be illustrated and described with reference to the landing system of my U.S. Pat. No. 4,429,312. It should be understood, however, that this invention provides techniques which are applicable to many different landing systems, and therefore it is not limited to improvements to the precision landing system of the type shown and described in that patent.

As shown in that patent, and described in Columns 8 and 9 thereof, and patented system provides a ground based precision landing guidance installation which radiates localizer and glideslope guidance beams from separate antennas which are directed along the approach path toward a landing aircraft, and which are received in the aircraft and processed to recover signals which provide landing indications to the pilot. In the system shown in that patent, the ground based system can either be triggered to generate replies in synchronization to some reference signal, as for example in synchronization to signals received from a weather radar, or can be free running and simply received and used by an approaching aircraft. The former type of system is the system to which the present improvements are directed and therefore the free running mode of operation of the landing system will not be further discussed.

Turning to FIG. 1, the landing system there illustrated includes a ground installation and an airborne installation. The ground installation includes, for lateral aircraft guidance, two directive antennas 21 and 22 having precision guidance localizer antenna beam patterns 23 and 24, with cross-sections marked B and C. The ground installation also includes a non-directive antenna 5 delivering an omni-pattern 25. These antennas 5, 21 and 22 are connected by a switch 26 and cable 27 to a radar transmitter 32. Timing and switching circuitry 29 controls the switch 26 and initiates the outputs of the transmitter 32.

The directive antenna patterns of two paired glideslope antennas 33 and 34 are aligned and partially overlapped respectively above and below a predetermined glideslope (usually 3 degrees), so that for aircraft approaching precisely along the glideslope, the signal intensities received in the aircraft from these paired antennas 33 and 34 will be equal.

For vertical glideslope guidance, the ground installation further includes two directive antennas 33 and 34 for radiating paired precision glideslope guidance beams 33a and 34a, with cross-sections marked D and E. These two antennas 33 and 34 are likewise connected to the transmitter 32 through the antenna switch 26. The paired beam patterns of the antennas 23 and 24 for lateral guidance overlap so that they provide equal intensity signals along the extended centerline CL of the runway. Thus, if the signal intensities of both antennas are equal, as received in the airborne vehicle, it must be laterally located over the centerline of the runway.

For an on-course approach, all four guidance signal intensities received in the aircraft will be equal. However, deviation above or below, or to the right or left of the desired approach course, wiill cause an unbalance in the paired signals received at the receiver, indicating to the pilot the direction in which the aircraft has deviated from the desired course. This operation is thoroughly described in my U.S. Pat. No. 4,429,312.

The airborne installation of the system according to that patent is shown in the right in FIG. 1, and includes a radar receiver 8 and an antenna 3. The radar receiver 8 is connected to a range gate and navigation processor 15 which provides range data to a range readout 18 and to a course deviation indicator 20 connected thereto.

A transmission from the ground installation is initiated by sending a trigger signal T2 to the timing and switching circuitry 29. This transmission includes a sequence of multiple successively delivered signals. First, the timing and switching circuitry 29 delivers, through the omni antenna 5, a coded pulse group reference signal A from the transmitter 32. The strength of the reference signal is used to set the gain of the aircraft receiver 8 so as to keep the airborne receiver operating within a linear portion of its response characteristic. After a fixed delay, determined by the timing and switching circuitry 29, the switch 26 then steps sequentially to connect the transmitter 32 in turn to each of the four directive antennas 21, 22, 33 and 34 to deliver transmissions, including right and left paired localizer pulses, and up and down paired glideslope pulses. These pulses are delivered one at a time with suitable delays between them. Adjustable attenuators 44 serve to balance the antenna drives so that the guidance signals are all of equal amplitude when the aircraft is exactly on course for landing, as explained in my U.S. Pat. No. 4,429,312. The sequence of these four guidance signals is predetermined and fixed so that the aircraft can identify the signals by their order in the sequence.

The pulses radiated in these precision guidance beams B, C, D and E in FIG. 1, plus the reference signal group A from the omni antenna, are received at the airborne antenna 3, and delivered by the receiver 8 to a processor 15 in the aircraft. The processor 15 is programmed to use the reference signal A to determine range and to display it at the range readout 18, and to use the precision landing signals B, C, D and E to create and deliver to the course deviation indicator 20 output signals which show the position of the aircraft with respect to the desired approach path.

The equipment used to uniquely identify the ground installation of FIG. 1 will now be described. The ground installation of FIG. 1 is provided with a GPS receiver/computer 60, a GPS antenna 62 connected to the receiver, and a Time Slot Selector 64. The GPS receiver/computer 60 provides precision geographic position using the GPS or NAVSTAR Satellite system 66. The ground installation need only be provided with a receiver suitable for providing an output signal T1 representative of GPS system time. The availability of such receivers is becoming all the more commonplace. A relatively current description of available equipment is provided in the Nov. 4, 1985 edition of *Aviation Week & Space Technology*, "Global Positioning Develops As Civil Navigation System", page 58. The Time Slot Selector 64 uses the GPS system time output signal T1 to develop a trigger signal T2 for the timing and switching means 29. Each ground installation would have a unique time slot or channel assigned so that its' transmissions are differentiated from those of surrounding or nearby ground stations. This trigger signal T2 is delivered by the Time Slot Selector 64 at specific GPS clock times assigned to that specific ground station for purposes of uniquely identifying that ground station. The number of times per second that the trigger signal T2 must be generated depends on the rate at which guidance signals are required by the aircraft in order to have adequate guidance loop stability. A nominal value is twenty times a second. The timing and switching circuitry 29 sets the switch 26 to the correct position, provides delays, and drives the transmitter 32 to deliver the omni encoded reference signal A followed by the two sets of paired directive signals B and C, and D and E.

Turning now to the aircraft installation, just as in the case of the ground installation, an aircraft need only be provided with a simple GPS receiver/computer which provides an output signal T1 representative of GPS system time. This receiver 68 is also provided with a suitable antenna 70 and the output of the receiver is connected to a time slot selector 72. Preferably, the Time Slot Selector 72 is tunable to whatever channel the pilot desires in order to receive a selected ground installation which, in accordance with the drawing, is the channel corresponding to the ground installation of FIG. 1. Once the Time Slot Selector 64 is tuned to the ground station of interest, the synchronous guidance signals returned from the ground installation through the aircraft antenna 3 and aircraft receiver 8 become isolated by the time slot gating process and thus become identifiable as returns of interest to that aircraft, as distinguished from same-frequency synchronous landing guidance signals from other ground installations in the vicinity transmitting at the same frequency.

Since the time at which the selected ground installation transmitter 32 is triggered into operation is known, and since the time that it takes for the synchronous transmitted signals to be received in the aircraft can be measured, the range gate and navigation processor 15 can easily calculate the range between the aircraft and the ground installation. This range may be displayed on a digital readout 18 in the cockpit of the aircraft. If the GPS receiver/computer installed in the aircraft is a "full computer", an output signal PA can be obtained which is representative of the aircraft's geographic position relative to the surface of the earth. Since the ground installation of interest is fixed on the earth, the position of the ground installation PG can be used, together with the aircraft position signal PA, to obtain a direct readout of the range 18' between the aircraft and the ground installation. This readout may also be used as a cross reference or check on the range readout 18 obtained by measuring the time between the transmission and the receipt of signals at the aircraft. It may also be used with altitude information to determine glideslope position and, hence, as an instrument cross reference check. Furthermore, it may be used with glideslope information to cross-check the aircraft's altimeter.

The timing accuracy of the GPS clock time trigger signal T1 is limited by the GPS circular error probability (CEP). Conventional P-Code and C/A code CEP's are expected to be 10 to 50 meters. Differential P-Code and differential C/A CEP accuracy is typically from 2 to 6 meters. Since the GPS CEP and hence GPS clock errors due to unknown propagation delays at both the ground and airborne installations should be the same, assuming the use of similar GPS constellations, the range obtained by measuring the difference or interval between the GPS clock time at which landing guidance signals are transmitted from the ground and the GPS clock time at which they are received in the air (i.e., clocked range measurement) would have these unknown errors eliminated. Therefore, the clocked range measurement accuracy should coincide with differential GPS position accuracy (i.e., better than conventional). In other words, we have the surprising result that the use of clocked GPS time for channelization results in a range-to-touchdown measurement approaching that of differential GPS, while using only a conventional GPS receiver.

Those skilled in the art will appreciate the fact that excellent range measurement accuracy is of importance for the landing operation, particularly for those applications where centerline guidance is desired for an offset ground beacon installation. This would be especially useful in military applications. Centerline guidance may be achieved by the use of the range readout 18 and course deviation indicator 20 signals.

The number of stations that can be uniquely and usefully identified by this use of GPS clock time and associated time slotting technique may be determined by considering the following:

(1) No two ground stations should radiate close enough together in time such that signals from one ground station can possibly arrive at an aircraft and be detectable and, hence, potentially generate signals falsely usable to generate landing guidance in the time slot assigned to another ground station. To preclude this occurrence, it is necessary to first establish the distance from a ground station at which an aircraft can usably detect signals from that ground station. Assuming this distance is 80 miles, then no two ground stations in such proximity can, in general, radiate guidance signals closer together in time than the noted 80 miles, multiplied by the 6 microseconds per mile speed of radio frequency propagation, or approximately 500 microseconds. If this precaution is not taken, then signals from both ground stations could possibly arrive at one aircraft in the time slot G2 during which the processor is activated to generate landing guidance, and hence, either cause garbling or provide guidance data directing the aircraft to the wrong ground station.

(2) A further consideration in this regard is that each ground station should, preferably, radiate 20 guidance pulse groups per second to maintain guidance loop stability. This then means that each ground station must have allocated to it, each second, 20×500 microseconds, or 10,000 microseconds, during which no other ground station in the noted 80 mile proximity can radiate. This 10,000 microseconds, or 0.01 seconds total time interval, must therefore be allocated to each ground station per second for this typical illustration. This means that only 100 uniquely identifiable ground station can be located in the noted 80 mile proximity. As a practical matter, therefore, one can note that at least some 100 unique sets of identifying radiating times can be assigned for uniquely identifying any one of 100 same frequency ground stations within an 80 mile radius area. This number is more than adequate since, as noted previously, the conventional ILS system has only 40 frequency channels assigned for unique identity purposes.

Finally, the airborne navigation processor 15 may be provided with a relatively narrow range gate for tracking all ground installation response signals, including the omni signals A and the paired directive signals B and C, and D and E from the ground installation. The directive signals would be processed to give precision guidance to the pilot, using the visual course deviation indicator display 20. Infrequently, however, other same-frequency signals from the selected landing installation or other landing installations in the vicinity (such as generated by a system covered by my Patent 4,429,312), may fall within the range gate. The effect of these same-frequency signals will be minor, if averaged with the desired signals from the selected ground installation, since they occur relatively infrequently and are not synchronous to GPS time. This minor effect may be further minimized by storing the values of all received signals that fall within the range gate in a computer memory, and by using, for guidance purposes only, those stored signals that fall within prescribed limits of a running average of all signals. This is termed "wildpoint" editing.

This invention is not to be limited to the embodiments shown and described, because changes may be made within the scope of the following claims. For example, the technique of my U.S. Pat. No. 4,429,312 may be used simultaneously with the technique described in this patent application. This simultaneous use may be of particular advantage in making a transition to GPS (i.e., the ground installation could radiate both on a clock basis and in response to weather radar interrogations or free run. Thus, it should be understood that no limitation with respect to the specific apparatus illustrated herein is intended or should be inferred. It is, of course, intended to cover by the appended claims, all such modifications as fall within the scope of the claims.

I claim:

1. A system for guiding a vehicle along a path utilizing a plurality of satellites each of which transmits signals representing the position of the satellite and precise time in a common time reference, comprising:
   a guidance station including:
      means for receiving said position and precision timing signals to provide a precision, guidance station clock signal in said common time reference;
      means responsive to said precision, guidance station clock signal for transmitting, within a time period associated with said guidance station, guidance signals with respect to said guidance path to direct a vehicle along said path;
   said vehicle including:
      means for receiving said position and precision timing signals to provide a precision, vehicle clock signal in said common time reference, said precision, vehicle clock signal being in synchronization with said precision, guidance station clock signal;
      means for receiving said guidance signals; and
      means coupled to said guidance signal receiving means and responsive to said vehicle clock signal for processing guidance signals received only in said time period associated with said guidance station to guide said vehicle along said path.

2. A system for guiding a vehicle along a path as recited in claim 1 wherein said transmitting means transmits a pair of overlapping precision guidance signal beams symmetrically disposed about said path.

3. A system for guiding a vehicle along a path as recited in claim 2 wherein said transmitting means transmits said signal beams in a predetermined sequence.

4. A system for guiding a vehicle along a path as recited in claim 1 including a plurality of guidance stations wherein the transmitting means associated with each of said guidance stations transmits said guidance signals at the same frequency.

5. A system for guiding a vehicle along a path as recited in claim 4 wherein each of said transmitting means has an operating range and each guidance station within the operating range of one or more other guidance stations has an associated time period that is nonoverlapping with the time periods associated with the other of said guidance stations.

6. A system for guiding a vehicle along a path as recited in claim 1 wherein said transmitting means has an operating range and said time period is sufficiently long to allow a guidance signal transmitted within said time period to be received within said time period by a vehicle within said operating range.

7. A system for guiding a vehicle along a path as recited in claim 1 including a range gate for tracking received guidance signals; means for storing guidance signals falling within said range gate; means for averaging said storage guidance signals; and means for determining whether a stored guidance signal falls within limits associated with said average, wherein only guidance signals falling within said limits are used to guide said vehicle along said path.

8. A system for guiding a vehicle along a path as recited in claim 1 wherein said guidance station has a fixed position relative to the surface of the earth and said vehicle means for receiving said position and precision timing signals includes means for determining said vehicle's geographic position relative to the surface of the earth and further including means for storing said fixed position of said guidance station; and means responsive to said vehicle's position and to said guidance station's position for determining the range between said vehicle and said guidance station.

9. A system for guiding a vehicle along a path as recited in claim 1 wherein said guidance station is located at a known position and includes:
   means for determining the position of said guidance station in response to the signals received from said satellite;
   means for measuring the difference between said determined position and said known position; and
   means for providing a correction signal based on said difference, said correction signal being transmitted by said transmitting means.

10. A system for guiding a vehicle along a path utilizing a plurality of satellites each of which transmits signals representing the position of the satellite and precise time in a common time reference comprising:
   first means for receiving said position and precision timing signals to provide a first clock signal in said common time reference;
   means responsive to said first clock signal for transmitting within a time period associated with said transmitting means guidance signals with respect to said guidance path to direct a vehicle along a path and a reference signal, said reference signal being transmitted at a precise time with respect to said first clock signal and within said time period;
   second means disposed in said vehicle for receiving said position and precision timing signals to provide a second clock signal in said common time reference, said second clock signal being in synchronization with said first clock signal;
   means disposed in said vehicle for receiving said guidance and reference signals; and
   means coupled to said guidance and reference signal receiving means and to said second means for processing guidance signals received only in said time period associated with said guidance station to guide said vehicle along said path, said processing means including:
      means for determining the time of receipt of said reference signal in said common time reference; and
      one way range determining means for determining the range of said vehicle from said transmitting means based upon the difference between said precise time at which said reference signal is transmitted and said time of receipt of said reference signal.

11. A system for guiding a vehicle along a path as recited in claim 10 wherein said transmitting means includes an omni-directional antenna for radiating said reference signal.

12. A system for guiding a vehicle along a path as recited in claim 10 wherein said reference signal is encoded to identify said guidance station.

13. A system for guiding a vehicle along a path as recited in claim 33 wherein said guidance station has a fixed position relative to the surface of the earth and said vehicle means for receiving said position and precision timing signals includes means for determining said vehicle's geographic position relative to the surface of the earth and further including means for storing said fixed position of said guidance station; and means responsive to said vehicle's position and to said guidance station's position for determining the range between said vehicle and said guidance station.

14. A system for guiding a vehicle along a path as recited in claim 13 including means for comparing said range determinations to check the accuracy thereof.

15. A system for guiding a vehicle utilizing a plurality of satellites each of which transmits signals representing the position of the satellite and precise time in a common time reference, comprising:
   first means for receiving said position and precision timing signals to provide a first clock signal in said common time reference;
   means responsive to said first clock signal for transmitting a range signal at a precise time with respect to said first clock signal and within a time period associated with said transmitting means;
   second means disposed in said vehicle for receiving said position and precision timing signals to provide a second clock signal in said common time reference, said second clock signal being in synchronization with said first clock signal;
   means disposed in said vehicle for receiving said range signal; and
   one way range means coupled to said range signal receiving means and to said second means for processing a range signal received within said time period to determine range from the difference between said precise time of transmission and the time of receipt of said range signal.

16. A system for guiding a vehicle as recited in claim 15 wherein said transmitting means further transmits a pair of overlapping precision guidance signal beams symmetrically disposed about a path within said time period and said processing means includes means for processing guidance signal beams received by said receiving means to guide said vehicle along said path.

17. A system for guiding a vehicle as recited in claim 16 wherein said transmitting means transmits said signal beams in a predetermined sequence.

18. A system for guiding a vehicle as recited in claim 15 wherein said first means and transmitting means are located at a ground station.

19. A system for guiding a vehicle as recited in claim 18 including a plurality of ground stations wherein the transmitting means associated with each of said ground stations transmits said guidance signals at the same frequency.

20. A system for guiding a vehicle along a path as recited in claim 19 wherein each of said transmitting means has an operating range and each ground station within the operating range of one or more other ground stations has an associated time period that is nonoverlapping with the time periods associated with the other of said guidance stations.

21. A system for guiding a vehicle as recited in claim 15 wherein said transmitting means has an operating range and said time period is sufficiently long to allow a range signal transmitted within said time period to be received within said time period by a vehicle within said operating range.

22. A system for guiding a vehicle as recited in claim 15 wherein said transmitting means includes an omni-directional antenna for radiating said range signal.

23. A system for guiding a vehicle as recited in claim 15 wherein said range signal is encoded to identify said guidance station.

24. A system for guiding a vehicle as recited in claim 15 wherein said guidance station having a fixed position relative to the surface of the earth and said vehicle means for receiving said position and precision timing signals includes means for determining said vehicle's geographic position relative to the surface of the earth and further including means for storing said fixed position of said guidance station; and means responsive to said vehicle's position and to said guidance station's position for determining the range between said vehicle and said guidance station.

25. A system for guiding a vehicle as recited in claim 24 including means for comparing said range determinations to check the accuracy thereof.

* * * * *